(12) United States Patent
Hamaoka et al.

(10) Patent No.: US 8,226,372 B2
(45) Date of Patent: Jul. 24, 2012

(54) ELECTRIC COMPRESSOR

(75) Inventors: Koji Hamaoka, Osaka (JP); Hidetoshi Nishihara, Fujisawa (JP); Katsumi Endo, Fujisawa (JP); Makoto Katayama, Chigasaki (JP); Shuichi Yakushi, Yokohama (JP); Tatsuyuki Iizuka, Chigasaki (JP); Yuji Saiki, Yokohama (JP); Hidehisa Tanaka, Ritto (JP); Tomonori Ouchiyama, Kusatsu (JP)

(73) Assignee: Panasonic Corporation (JP)

( * ) Notice: Subject to any disclaimer, the term of this patent is extended or adjusted under 35 U.S.C. 154(b) by 2369 days.

(21) Appl. No.: 10/515,196

(22) PCT Filed: Mar. 16, 2004

(86) PCT No.: PCT/JP2004/003464
§ 371 (c)(1),
(2), (4) Date: Nov. 19, 2004

(87) PCT Pub. No.: WO2004/084401
PCT Pub. Date: Sep. 30, 2004

(65) Prior Publication Data
US 2006/0039807 A1    Feb. 23, 2006

(30) Foreign Application Priority Data

Mar. 17, 2003  (JP) .................. 2003-071421
Sep. 19, 2003  (JP) .................. 2003-327817
Dec. 16, 2003  (JP) .................. 2003-417810

(51) Int. Cl.
*F04B 49/06* (2006.01)
*F04B 17/03* (2006.01)

(52) U.S. Cl. ............ 417/42; 417/44.1; 417/53; 417/415
(58) Field of Classification Search .............. 417/42, 417/44.1, 415, 902, 53
See application file for complete search history.

(56) References Cited

U.S. PATENT DOCUMENTS

| 5,013,990 A * | 5/1991 | Weber ............... 318/814 |
| 5,110,264 A * | 5/1992 | Murry ............... 417/45 |
| 6,206,643 B1 * | 3/2001 | Jeong ............... 417/45 |

(Continued)

FOREIGN PATENT DOCUMENTS

JP    61-135389 A    6/1986

(Continued)

OTHER PUBLICATIONS

Relevant Portion of Chinese Office Action issued for corresponding Chinese Patent Application No. 2004800002232, dated Jan. 12, 2007.

(Continued)

*Primary Examiner* — Charles Freay
(74) *Attorney, Agent, or Firm* — Rossi, Kimms & McDowell LLP (57) ABSTRACT

A compressor includes a motor driven by a controller and having a rotor and a stator, a compressing unit driven by the motor in a hermetic container in which refrigerant is filled. Driving the motor at a low rpm, the controller practices a feedback control which determines a timing of turning on/off switching elements based on a signal detecting a position of the rotor, and when the motor is driven at a high rpm, the controller practices an open-loop control which outputs a given frequency and drives the motor synchronizing with the given frequency. This structure achieves a compressor working with a fewer noises in PWM driving.

6 Claims, 6 Drawing Sheets

U.S. PATENT DOCUMENTS

| | | |
|---|---|---|
| 7,102,306 B2 | 9/2006 | Hamaoka et al. |
| 2006/0039807 A1 | 2/2006 | Hamaoka et al. |
| 2006/0082339 A1 | 4/2006 | Hamaoka et al. |

FOREIGN PATENT DOCUMENTS

| | | | |
|---|---|---|---|
| JP | 62-260583 A | | 11/1987 |
| JP | 62260583 A | * | 11/1987 |
| JP | 3-55478 | | 3/1991 |
| JP | 07-337081 A | | 12/1995 |
| JP | 09-088837 A | | 3/1997 |
| JP | 9-88837 A | | 3/1997 |
| JP | 10150793 A | * | 6/1998 |
| JP | 2000-287483 A | | 10/2000 |
| JP | 2001-37281 A | | 2/2001 |
| JP | 2001-218398 A | | 8/2001 |
| JP | 2520484 Y | | 11/2002 |
| JP | 2003-3958 | | 1/2003 |
| JP | 2003003958 A | * | 1/2003 |
| JP | 2003-111481 A | | 4/2003 |
| JP | 2003-219681 A | | 7/2003 |
| JP | 2005094971 A | | 4/2005 |

OTHER PUBLICATIONS

Office Action issued Sep. 6, 2011 for corresponding JP 2009067439; English translation of relevant portion provided.

* cited by examiner

ELECTRIC COMPRESSOR

TECHNICAL FIELD

The present invention relates to electric compressors driven by an inverter and used mainly in household refrigerators and air-conditioners.

BACKGROUND ART

Recently a brush-less DC motor has been increasingly employed in compressors used in refrigerating systems because of its high efficiency. A conventional compressor is known to work in the following manner: Detect a rotor position using back electromotive force (BEMF) yielded in stator windings of a motor, and drive the motor based on the detection signal, at the same time, chop the switching elements, thereby practicing the pulse width modulation control. An instance of such a conventional compressor is disclosed in Japanese Patent Application Non-Examined Publication No. H03-55478.

Figure 8:
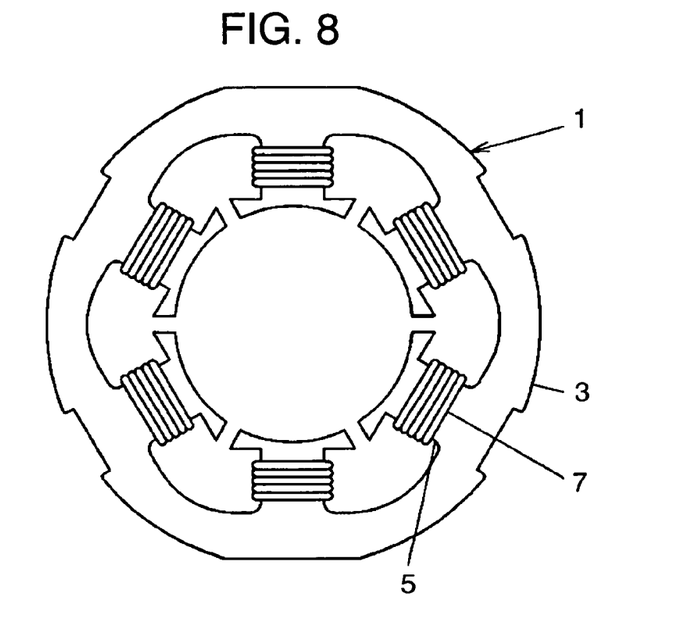
FIG. 8 shows a top view of a stator of a motor employed in a conventional compressor.
Figure 9:
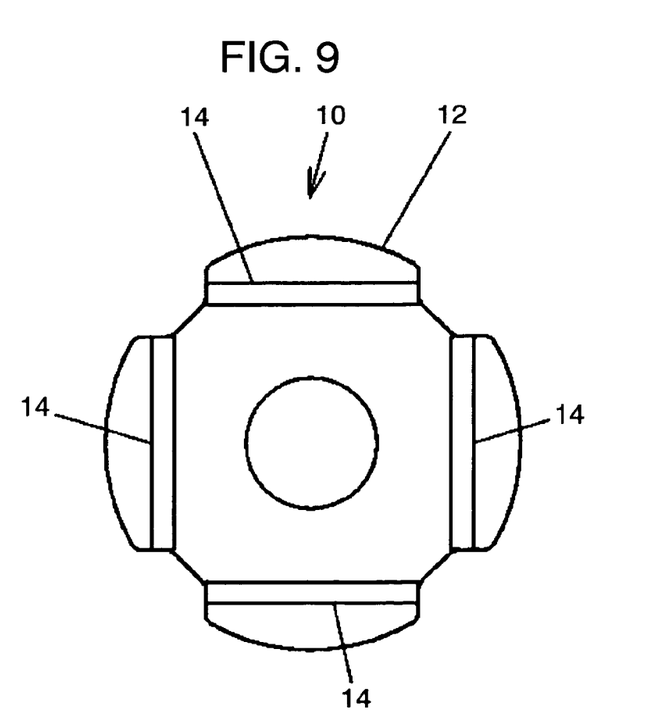
FIG. 9 shows a top view of a rotor of a motor employed in the conventional compressor.
Figure 10:
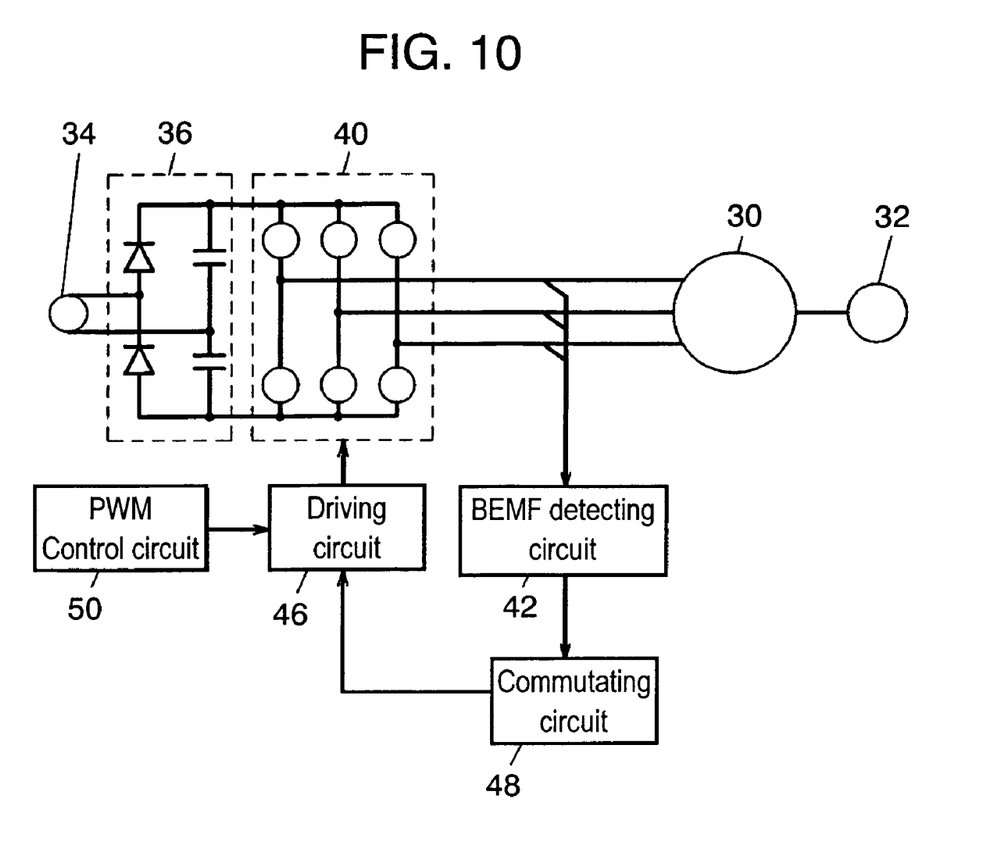
FIG. 10 shows a circuit diagram of a controller employed in the conventional compressor.

A controller of the conventional compressor is described hereinafter with reference to FIG. 8-FIG. 10. FIG. 8 shows a top view of a stator of a motor employed in the conventional compressor. FIG. 9 shows a top view of a rotor of the motor employed in the conventional compressor. FIG. 10 is a circuit diagram of the controller employed in the conventional compressor.

In FIG. 8, stator 1 of the motor is equipped with plural teeth 5 formed on core 3. Each one of teeth 5 is wound by concentrated windings 7. In FIG. 9, rotor 10 of the motor forms an interior permanent magnet (IPM) rotor in which four plate-like permanent magnets 14 are buried in iron core 12. In FIG. 10, motor 30 comprises stator 1 shown in FIG. 8 and rotor 10 shown in FIG. 9, and activates compressing mechanism 32 via a shaft (not shown). Rectifying circuit 36 for rectifying the AC of commercial power 34 adopts a voltage doubler rectifying method, so that it receives AC100V and outputs DC250V.

Inverter 40 is formed by bridging six pieces of switching elements for a three-phase operation. Inverter 40 converts the DC voltage output from rectifying circuit 36 into an output having a voltage and a frequency for three phases, thereby powering motor 30. Each one of the three phases is energized at 120 degrees in electric angles, so that an alternating current of rectangular waveform is supplied to motor 30.

Back electromotive force (BEMF) detecting circuit 42 detects a relative rotor position with respect to the stator by using BEMF yielded in the respective stator windings of the three phases of motor 30. Driver circuit 46 turns on or off the switching elements of inverter 40. Commutating circuit 48 determines which switching element of inverter 40 be turned on or off based on an output signal from BEMF detecting circuit 42 while motor 30 is in steady operation. PWM control circuit 50 chops switching elements either one of the upper arm or the lower arm of inverter 40, thereby carrying out PWM (pulse width modulation) control.

The PWM control refers to raising/lowering of an average output voltage by raising or lowering the duty of pulse width. The duty is defined in this specification as a ratio of an on-period vs. a pulse cycle.

An operation of the controller of the conventional compressor discussed above is described hereinafter. When motor 30 is activated from a stopped state, it is impossible to detect a rotor position because the rotor windings do not yield BEMF yet. Thus inverter 40 compulsorily outputs a voltage having a low frequency and a low duty. Application of the output voltage to the stator windings compulsorily starts the motor rotating. This is generally referred to as a sync. at a low frequency for energizing.

The motor thus starts rotating and increases its rpm to a certain level, then stator windings of respective phases yield BEMF, and BEMF detecting circuit 42 outputs a rotor position detecting signal. Commutating circuit 48 logically processes the position detecting signal, and outputs a commutating signal to drive circuit 46. Based on the commutating signal, drive circuit 46 turns on/off the six switching elements of inverter 40 one by one, thereby powering the respective phases of the stator windings one by one. The motor thus works steadily (under the feedback control by the position detecting signals) as a DC motor.

With respect to the DC motor, variation of a voltage applied to the motor can control rpm. Therefore, increment of duty in PWM based on a signal supplied from PWM control circuit 50 raises an average of the voltages applied to the motor, so that the motor increases its rpm. On the contrary, decrement of the duty lowers the average of the voltages applied to the motor, so that the motor reduces its rpm.

Since the position detecting signal supplied from BEMF detecting circuit 42 synchronizes with the rotation of the rotor, the rpm can be detected by this signal. The detected rpm signal is compared with a speed reference signal, and the comparison result is fed back for adjusting the duty, thereby controlling the rpm of the motor.

Meanwhile, the duty is defined by the following equation:

Duty={on period/(on period+off period)}×100. For instance, when an on-period is 50% and an off-period is 50%, the duty becomes 50%.

The foregoing conventional structure controls the rpm using a pulse duty supplied from PWM control circuit 50, and a chopping frequency (hereinafter referred to as a carrier frequency) in PWM ranges from several kHz to ten and several kHz in general, so that the carrier frequency is accompanied with noises.

Since IPM rotor includes permanent magnets 14 therein, a magnetic path coupling iron core 12 of rotor 10 to teeth 5 of stator 1 is formed. Therefore, when a current having a rectangular waveform is supplied to stator windings 7, the magnetic path is switched to the adjacent tooth 5 at switching of powering a phase, so that magnetic force sharply changes. As a result, stator 1 is deformed, which results in generating noises.

Since the rpm is controlled by a pulse duty, the max. output is achieved at a duty of 100%, so that the motor cannot work at a higher rpm than the rpm at this level. In order to obtain a necessary capacity of the compressor, an output of motor 30 must be increased, and in the case of using the same amount of copper as the stator windings, the motor efficiency lowers by an increased amount of output.

In order to solve the problems discussed above, three-phase sine-waveform AC instead of a rectangular waveform is applied to stator windings 7 of motor 30 so that noises can be reduced. However, a method of applying the three-phase sine-waveform AC needs a current detecting circuit for detecting a current flowing through the stator windings in order to calculate a position of the rotor, because it is difficult to obtain information about detecting a position of the rotor from the BEMF detecting circuit. In such a case, a current transformer is used in general for detecting the current, and a high-speed microprocessor is required for calculating the rotor position. As a result, the method of applying the three-phase sine-waveform AC becomes expensive.

DISCLOSURE OF THE INVENTION

The compressor of the present invention comprises the following elements:
- a hermetic container in which refrigerant is filled;
- a motor having a stator and a rotor equipped with permanent magnets, and being accommodated in the hermetic container and driven by a controller; and
- a compressing unit accommodated in the hermetic container and driven by the motor.

The controller works in two ways: In driving the motor at a low rpm, the controller carries out a feedback control where on/off timing of switching elements is determined by a rotor position detecting signal, and in driving the motor at a high rpm, the controller carries out an open-loop control where a signal of a given frequency is output, and the motor is synchronized with the given frequency for being driven.

The foregoing structure allows the compressor to work at a high rpm, so that a highly efficient motor of which max. output is set at a low level is achievable. Further, a duty can be relatively greater, so that noises accompanying the carrier frequency at the PWM control can be reduced. As such, the present invention can provide a compressor of low noise and high efficiency at an inexpensive cost.

PREFERRED EMBODIMENT FOR PRACTICING THE INVENTION

An exemplary embodiment of the present invention is demonstrated hereinafter with reference to the accompanying drawings.

Figure 1:
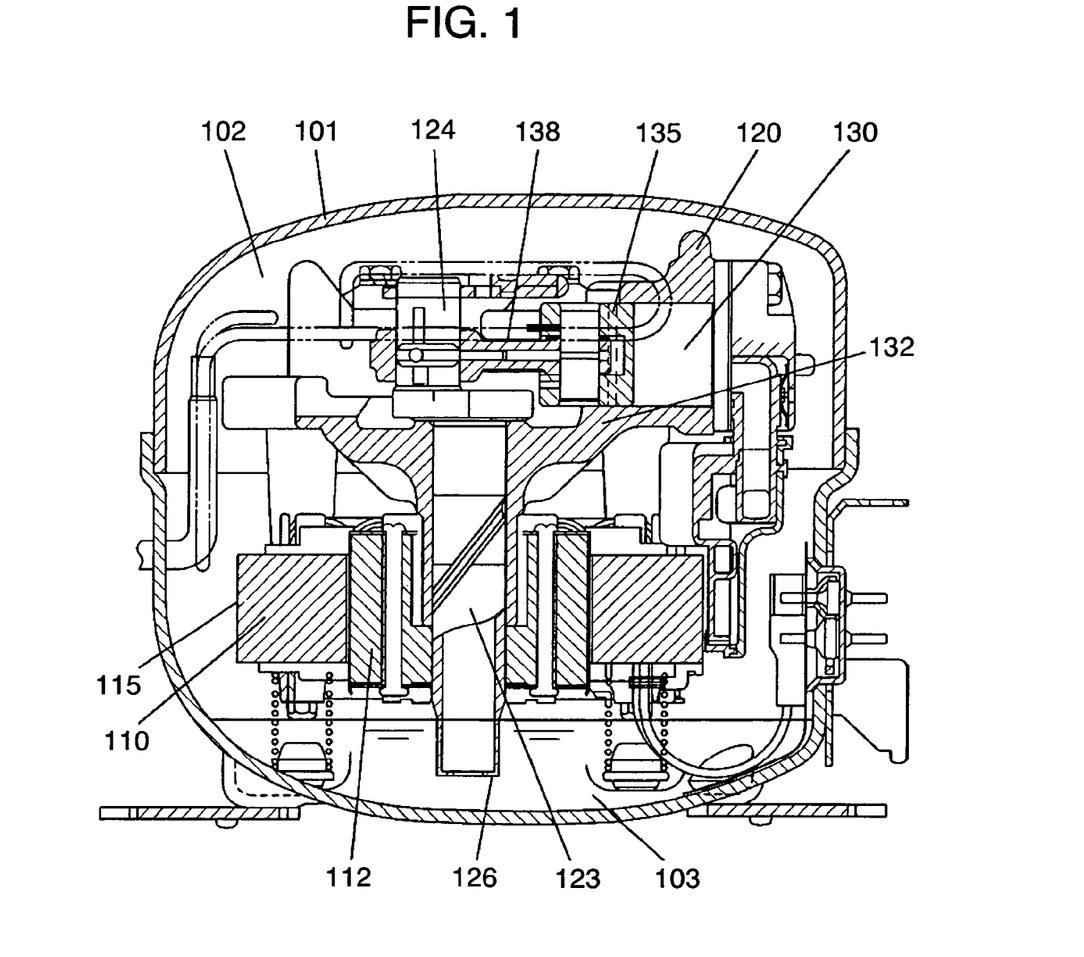
FIG. 1 shows a sectional view of a compressor in accordance with an exemplary embodiment of the present invention.
Figure 2:
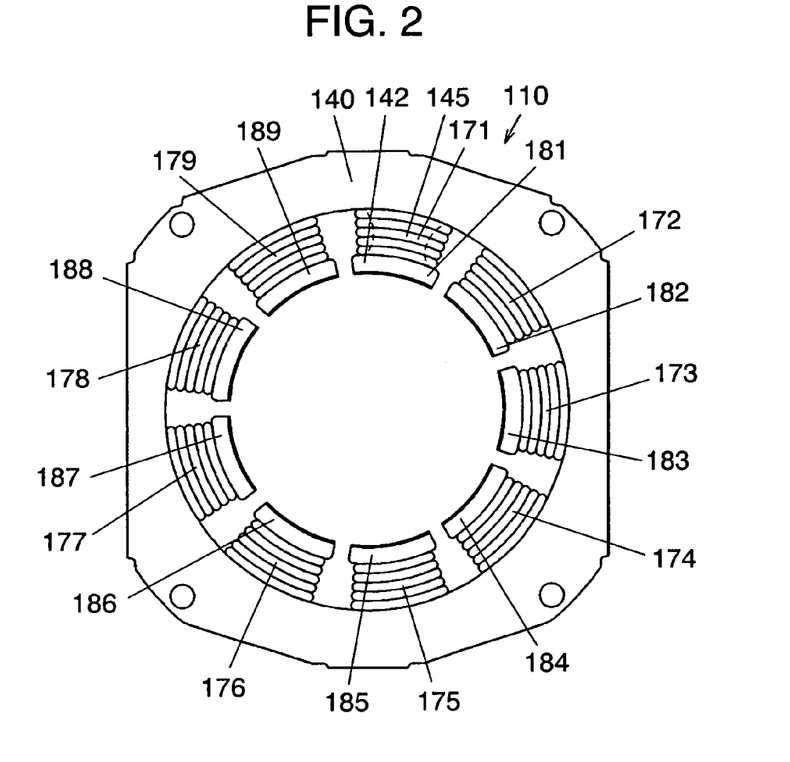
FIG. 2 shows a top view of a stator of a motor employed in the compressor shown in FIG. 1.
Figure 3:
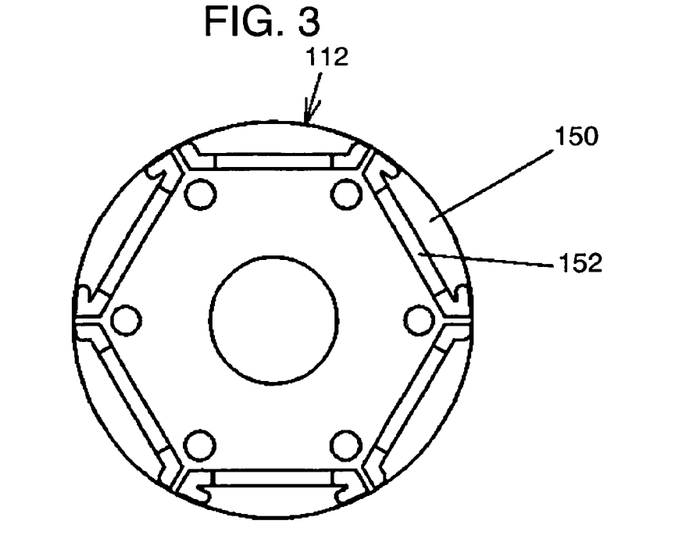
FIG. 3 shows a top view of a rotor of a motor employed in the compressor shown in FIG. 1.
Figure 4:
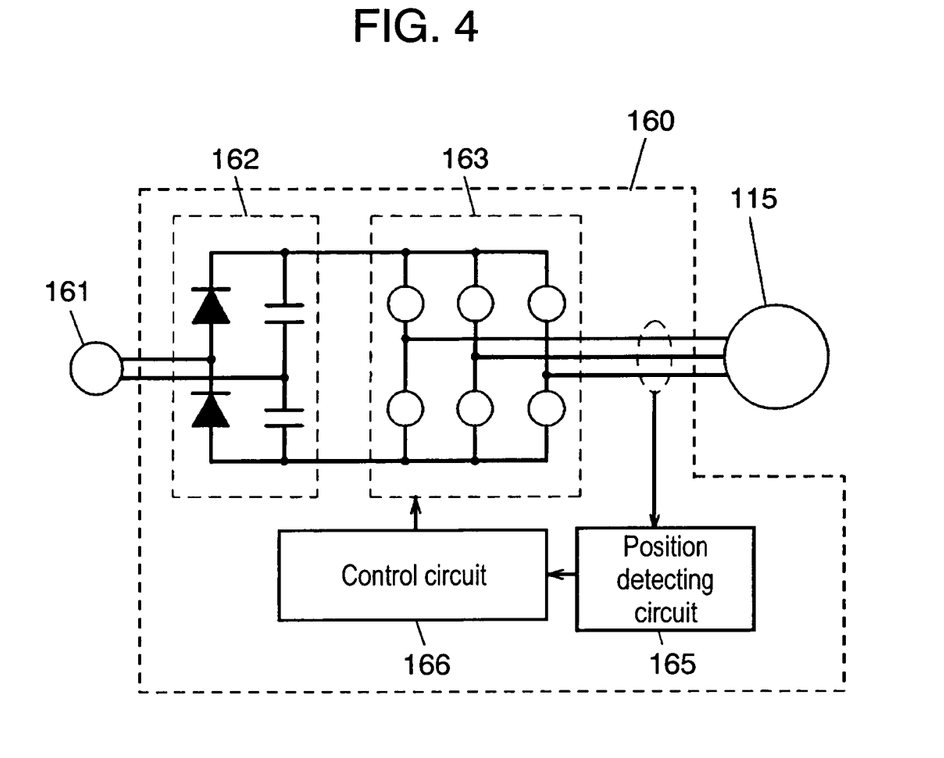
FIG. 4 shows a circuit diagram of a controller employed in a compressor in accordance with an exemplary embodiment of the present invention.
Figure 5:
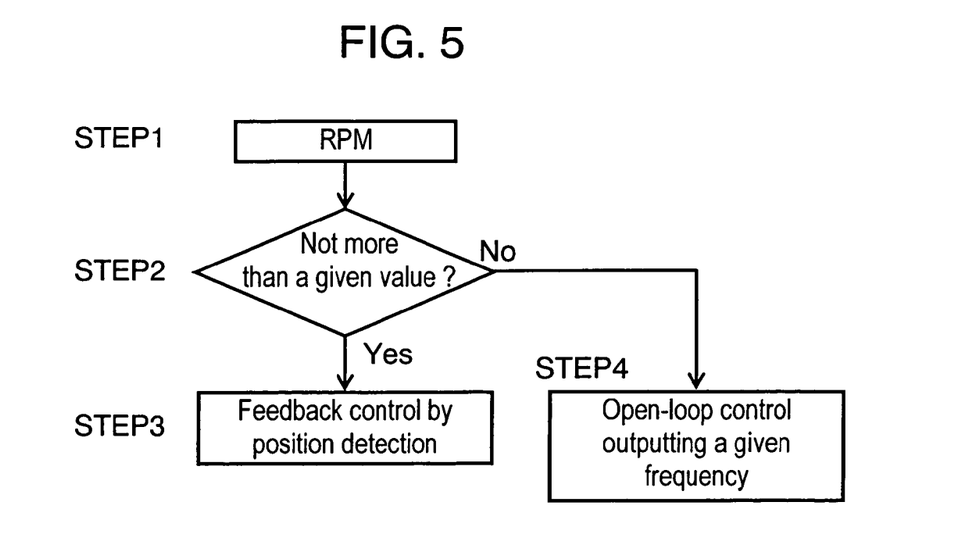
FIG. 5 shows a block diagram of the controller shown in FIG. 4.
Figure 6:
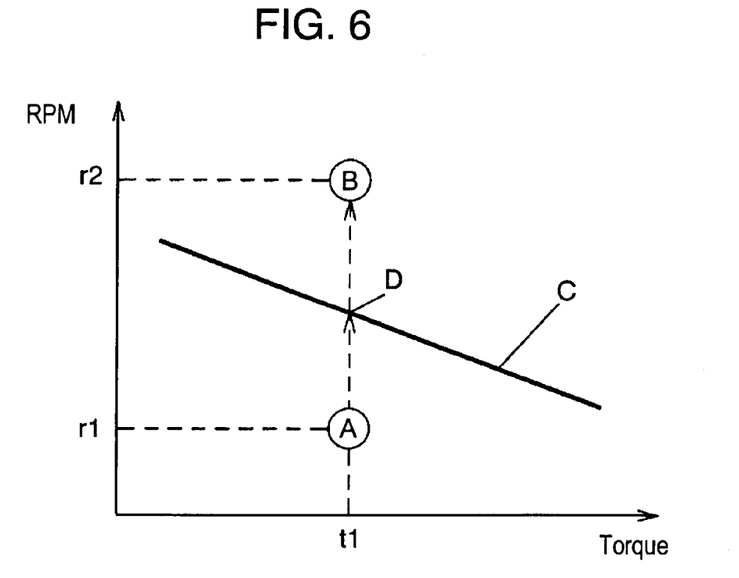
FIG. 6 shows relations between torque and rpm of a motor employed in a compressor in accordance with an exemplary embodiment of the present invention.
Figure 7:
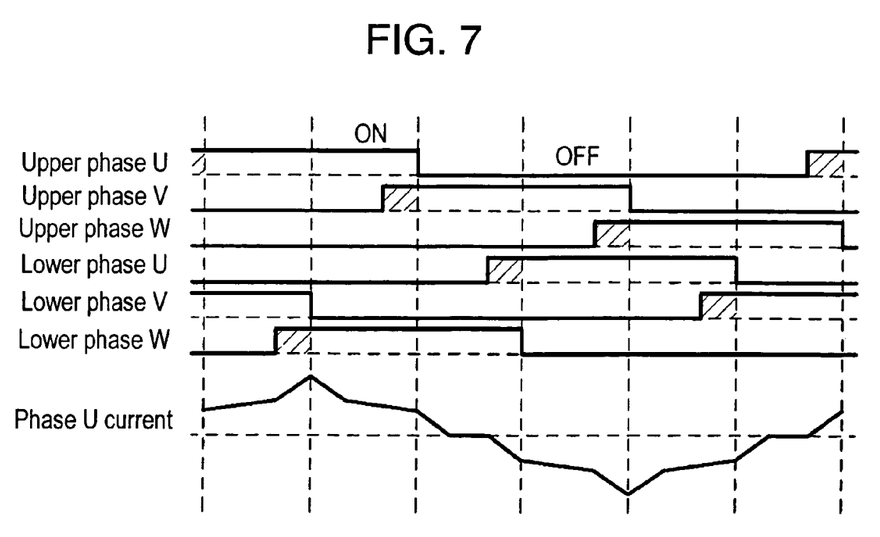
FIG. 7 shows characteristics of the controller employed in a compressor in accordance with an exemplary embodiment of the present invention.

FIG. 1 shows a sectional view of a compressor in accordance with the exemplary embodiment of the present invention. FIG. 2 shows a top view of a stator of a motor employed in the compressor shown in FIG. 1. FIG. 3 shows a top view of a rotor of a motor employed in the compressor shown in FIG. 1. FIG. 4 shows a circuit diagram of a controller employed in the compressor in accordance with the exemplary embodiment of the present invention. FIG. 5 shows a block diagram of the controller shown in FIG. 4. FIG. 6 shows relations between torque and rpm of a motor employed in the compressor in accordance with the exemplary embodiment of the present invention. FIG. 7 shows a timing-chart illustrating on/off timing and a current waveform of switching, elements of the controller employed in the compressor of the present invention.

In FIG. 1, hermetic container 101 pools oil 103 therein and includes refrigerant 102 filled therein. Ideal refrigerant 102 is R600a. Container 101 accommodates motor 115 equipped with stator 110 and rotor 112, and also holds elastically therein compressing unit 120 to be driven by motor 115.

Compressing unit 120 comprises the following elements:
- crankshaft 126 formed of main shaft 123, to which rotor 112 is fixed, and eccentric shaft 124;
- cylinder 132 for rotatably supporting main shaft 123 and including compressing chamber 130;
- piston 135 for reciprocating within compressing chamber 130; and
- connecting means 138 for coupling eccentric shaft 124 to piston 135.

Compressing unit 120 thus forms a reciprocating compressor.

As shown in FIG. 2, stator 110 has nine teeth 142 formed on core 140, and each one of teeth 142 is wound by concentrated winding 145, thereby forming a concentrated-winding stator.

The motor is a three-phase motor including phase-U winding, phase-V winding and phase-W winding, and they are coupled to each other in the following manner:

Winding 171 is concentratively wound on tooth 181. Winding 174 is concentratively wound on tooth 184. Winding 177 is concentratively wound on tooth 187. Those windings 171, 174 and 177 are coupled in series and form phase U windings.

Winding 172 is concentratively wound on tooth 182. Winding 175 is concentratively wound on tooth 185. Winding 178 is concentratively wound on tooth 188. Those windings 172, 175 and 178 are coupled in series and form phase V windings.

Winding 173 is concentratively wound on tooth 183. Winding 176 is concentratively wound on tooth 186. Winding 179 is concentratively wound on tooth 189. Those windings 173, 176 and 179 are coupled in series and form phase W windings.

In this embodiment, winding 145 represents the foregoing windings 171-179, and tooth 142 represents the foregoing teeth 181-189 for description purpose.

In FIG. 3, rotor 112 is equipped with six plate-like permanent magnets 152 buried at iron core 150 to form a rotor of an interior permanent magnet (IPM) type. Permanent magnet 152 is made of, e.g. neodymium-, iron-, and boron-based rare-earth magnet.

The motor is formed of stator 110 shown in FIG. 2 and rotor 112 disposed inside stator 110 and shown in FIG. 3. An inner face of each one of teeth 142 confronts an outer face of rotor 112 via a space.

The foregoing motor rotates using combined torque of magnet torque and reluctance torque. The magnet torque and the reluctance torque are produced depending on a relation between a rotary magnetic field that generated by a current flowing through winding 145 wound on each one of teeth 142 of stator 110 and permanent magnets 152 buried in iron core 150 of rotor 112. In other words, this motor uses not only the magnet torque but also the reluctance torque due to the effect of permanent magnets 152 buried in iron core 150 of rotor 112, so that the motor works more efficiently than other motors which use only the magnet torque.

Next, the controller of the compressor in accordance with this exemplary embodiment is demonstrated hereinafter. In FIG. 4, commercial power source 161 is, e.g. an AC power source of 100V, 60 Hz. Controller 160 is formed of rectifying circuit 162, inverter 163, position detecting circuit 165 and control circuit 166.

Rectifying circuit 162 rectifies the AC supplied from power source 161 and converts it into a DC. This embodiment employs a voltage doubler rectifying method, so that circuit 162 receives AC100V and outputs DC250V.

Inverter 163 is formed of six switching elements bridged in a three-phase manner, where the switching elements employ, e.g. insulating bipolar gate transistors (IBGT) or field effect transistors (FET). Three switching elements form an upper arm of inverter 163 and another three switching elements form a lower arm of inverter 163, and the upper elements have contacts with the lower elements respectively. Respective first ends of phase U winding, phase V winding and phase W winding are coupled to the respective contacts. Respective second ends of those windings are coupled to each other commonly and form a neutral point. Inverter 163 converts the dc output from rectifying circuit 162 into outputs having a given voltage and a given frequency for three phases by PWM control. Then inverter 163 supplies those outputs to the three-phase windings of motor 115. In this case, an output having an electrical angle of 120° is supplied to each one of three phases, or an output having an electrical angle ranging not less than 130° to less than 180° is supplied to one of the three phases, i.e. a wide angle energizing. In this embodiment, an electrical angle of 150° is used.

Position detecting circuit 165 detects BEMF generated at an input terminal of motor 115, i.e. the first ends of respective three-phase windings for detecting relatively a rotary position of rotor 112 with respect to stator 110.

Control circuit 166 switches a feedback control to/from an open-loop control in response to the operation of the motor. The feedback control determines a timing of turning on/off the six switching elements based on an output signal from position detecting circuit 165, and the open-loop control forces inverter 163 to supply an output having a given voltage and a given frequency regardless of the output signal from circuit 165.

An operation of the foregoing compressor is this: Motor 115 is driven by controller 160, and rotor 112 of the motor rotates crankshaft 126. Eccentric movement of eccentric shaft 124 linked to the crankshaft is converted via connecting means 138 into reciprocating movement of piston 135 in compressing chamber 130, so that compressing movement can be practiced.

An operation of controller 160 is demonstrated with reference to FIG. 5. In FIG. 5, controller 160 receives a signal from position detecting circuit 165, then recognizes an rpm of the motor in step 1. Next, when the rpm is found not more than a given value in step 2, i.e. driving at a low rpm, controller 160 carries out the feedback control based on the signal detecting the rotor's position in step 3. On the other hand, when the rpm is found not less than the given value in step 2, i.e. driving at a high rpm, controller 160 outputs a given frequency and synchronizes the motor with the given frequency in step 4. In other words, controller 160 carries out the open-loop control.

This open-loop control, i.e. controller 160 outputs a given frequency and synchronizes the motor with the given frequency, achieves a higher rpm than the feedback control which uses a position detecting signal.

The operations by the feedback control and the open-loop control are further detailed with reference to FIG. 6. In FIG. 6, line C represents the characteristics of the motor at the max. duty (e.g. 100%) under the feedback control based on a position detecting signal as usual. In general, an rpm decreases at greater torque.

Assume that an instructed rpm of the motor is "r1" and torque is "t1", in this condition the motor works at point A. At this time, control circuit 166 carries out the feedback control based on a position detecting signal, so that optimum phase-switching is practiced. Thus the motor works in an efficient manner.

Assume that the instructed rpm is changed to r2, then control circuit 166 increases a duty in order to obtain a higher rpm aiming at point B. The rpm thus increases and reaches point D crossing with characteristics line C. The duty reaches the max. value (e.g. 100%) at point D and the rpm cannot be further increased.

At this time, control circuit 166 fixes the duty at the max. value (e.g. 100%), and switches the control to the open-loop control which increases an output frequency. In other words, only the output frequency is raised regardless of the position detecting signal, and the motor is synchronized with the raised frequency and driven, namely, the motor is controlled to work as a synchronous motor.

In this case, a phase of the motor current operates in advance of a phase of BEMF generated in the stator windings, so that part of the motor current weaken the magnetic flux. As a result, the BEMF generated in the stator windings lowers, and the rpm for the BEMF to exceed the voltage supplied from the power source becomes higher, thereby allowing the motor to work at a higher rpm. This operation is generally called a field weakening control.

Next, energizing by use of a wider angle driving-waveform is described with reference to FIG. 7. In FIG. 7, the lateral axis represents time, and the vertical axis represents on/off status of each one of switching elements, i.e. an element at upper phase U, upper phase V, upper phase W, lower phase U, lower phase V, and lower phase W. FIG. 7 also shows a waveform of phase U current at the bottom. Since phase V current and phase W current are displaced 120° in electrical angles respectively with respect to phase U current and take similar waveforms to that of phase U current, those waveforms are omitted from FIG. 7.

As shown in FIG. 7, use of 150° in electrical angles as an energizing angle for wide-angle energizing allows the phase U current waveform to lower a rising current comparing with a rectangular current waveform in the case of usual 120° energizing. The phase U current waveform thus approximates to a sine waveform.

When controller 160 practices the feedback control based on the position detecting signal at the low rpm driving, the current approximates to a sine waveform due to the wide angle energizing, thereby reducing torque ripples of the motor. As a result, the case in accordance with this embodiment can remarkably reduce vibrations comparing with the conventional 120° energizing.

When controller 160 practices the open-loop control at the high rpm driving, namely, driving the motor at a given frequency, and carries out the wide-angle energizing at a duty of 100%, the current approximates to a sine waveform, thereby reducing the torque ripples of the motor. As a result, the motor spins smoothly, and the higher rpm can be expected.

In the foregoing discussion, the electrical angle of 150° is used as an energizing angle; however, an angle ranging from not less than 130° to less than 180° can produce a similar advantage to what is discussed above, and a case using one of those angles still falls within the scope of the present invention.

If the compressor in accordance with this exemplary embodiment needs the same refrigerating capacity as a conventional one, the compressor can reduce its cylinder volume due to the advantage of this embodiment. Thus piston 135 shown in FIG. 1 can be downsized, or an eccentric amount of eccentric shaft 124 with respect to main shaft 123 can be reduced. As a result, the compressor in accordance with this embodiment can reduce vibrations at compressing unit 120. This advantage can be revealed explicitly when R600a is used as refrigerant because R600a has a small refrigerant capacity but needs a large cylinder volume.

The advantage of this embodiment allows a user to use a motor of which max. output is set at a low level, so that a motor having windings more tightly wound, i.e. a highly efficient motor, can be employed, which can form an efficient compressor.

The duty at the same rpm can be relatively increased, so that noises at the carrier frequency under the PWM control can be relatively lowered.

A stator is formed by providing each one of the teeth of the iron core with a concentrated winding, and this stator can reduce noises of the carrier frequency and the torque ripples although it has a little vibration attenuating effect between the windings and the teeth, and tends to produce sounds by being vibrated. The compressor of the present invention thus achieves a low noise operation using an inexpensive and yet efficient motor with the concentrated windings.

The motor of the compressor in accordance with the present invention includes permanent magnets 152 shaped like plates and buried in iron core 150 of rotor 112 to form the IPM rotor which uses both of magnet torque and reluctance torque for the motor to work efficiently. Further, permanent magnets 152 are formed of neodymium-, iron-, and boron-based rare earth magnet in order to increase the magnetic flux density for obtaining higher efficiency.

In the IPM rotor, the interior magnets couple the iron core of the rotor to the teeth of the stator, thereby forming a powerful magnetic path. In this embodiment, since permanent magnets 152 are made of rare-earth magnet, a more powerful magnetic path can be formed. As a result, when each phase current shows a rectangular waveform, the magnetic path changes to an adjacent tooth at a phase switch, so that magnetic force sharply changes, which deforms the stator, thereby generating noises.

However, according to this embodiment, since the phase current is similar to a sine waveform, the current value becomes smaller before and after the phase switch, and even after the phase switch, the current value increases or decreases smoothly, so that magnetic forth changes only a little with respect to the stator. As a result, the deformation of the stator is suppressed, and vibrations are also suppressed to a low level, thereby achieving an efficient and low-noise compressor.

As discussed above, this exemplary embodiment proves that the present invention achieves an inexpensive, low-noise, and efficient compressor.

In this embodiment, a reciprocating compressor elastically supported in a hermetic container is demonstrated; however, a stator can be directly fixed to a hermetic container with a similar advantage, and a rotary compressor or a scrolling compressor also produces a similar advantage to what is discussed above.

In this embodiment, the permanent magnet made of rare-earth magnet is used; however, a magnet made of ferrite magnet can be used with a similar operation and advantage.

Further in this embodiment, rectifying circuit 162 adopts a voltage doubler rectifying method; however, it can adopt another rectifying method, e.g. a full-wave rectifying circuit or a half-wave rectifying circuit. It can also adopt a method that can switch an output voltage (e.g. voltage doubler rectification and full-wave rectification are switched by a relay or a semiconductor switch) or a method that can change an output to a linear one (e.g. DC-DC converter such as boosting chopper or high-voltage chopper). Position detecting circuit 165 adopts a method of detecting BEMF generated at an input terminal of motor 115; however, it can use a position detecting sensor such as a Hall element instead.

As discussed above, the controller of the motor used in the compressor of the present invention practices the feedback control which drives the motor in PWM manner based on a position detecting signal at the low rpm driving. The controller, on the other hand, practices the open-loop control which outputs a given frequency at the high rpm driving. When the motor is driven at a high rpm, the controller raises the output frequency regardless of the position detecting signal, and the rpm is raised synchronously with the frequency, so that the motor works as a synchronous motor. A current phase of the motor thus operates in advance of a phase of BEMF of the motor, then the field weakening control is activated, thereby allowing the motor to work at a higher rpm. As a result, an efficient motor of which max. output is set at a lower level can be used, and a duty for obtaining the same rpm can be relatively increased, thereby reducing noises of a carrier frequency under PWM control.

INDUSTRIAL APPLICABILITY

The compressor of the present invention can work at a high rpm, so that it can employ an efficient motor of which maximum output is set at a lower level. A duty can be relatively increased from a conventional one, thereby reducing noises of a carrier frequency under PWM control. As a result, an inexpensive, low-noise, and efficient compressor can be achieved. This compressor is suitable for household refrigerators and air-conditioners.

The invention claimed is:

1. An electric compressor comprising:
a hermetic container in which refrigerant is filled;
a motor having a stator and a rotor equipped with a permanent magnet, accommodated in the hermetic container;
a position detection device for detecting a position of the rotor and outputting a rotor position detection signal;
a controller for driving the motor; and
a compressing unit accommodated in the hermetic container and driven by the motor,
wherein the controller controls the motor with a feedback control, which determines a timing of turning on/off switching elements based on the rotor position detection signal, when the motor is driven a low rpm, and
wherein the controller controls the motor at a 100% duty with an open-loop control, which outputs a given frequency and drives the motor synchronously with the given frequency, such that the motor operates as a synchronous motor independently of the rotor position detection signal, when the motor is driven at a high rpm.

2. The compressor of claim 1, wherein the motor is a three-phase motor, and the controller energizes each one of the three phases of the motor at an electric angle ranging from not less than 130° to less than 180°.

3. The compressor of claim 1 or claim 2, wherein the stator includes teeth wound by windings in a concentrated manner.

4. The compressor of claim 1 or claim 2, wherein the permanent magnet is buried in an iron core which forms the rotor.

5. The compressor of claim 1 or claim 2, wherein the compressing unit includes a cylinder forming a compressing chamber, a piston reciprocating in the compressing chamber, a crankshaft having a main shaft and an eccentric shaft, and a connecting means coupling the piston to the eccentric shaft.

6. The compressor of claim 1 or claim 2, wherein the refrigerant is R600a.

* * * * *